United States Patent [19]

Jongkind et al.

[11] Patent Number: 5,593,655
[45] Date of Patent: Jan. 14, 1997

[54] PROCESS FOR PREPARING A LARGE MOLECULAR SIEVE

[75] Inventors: Hermanus Jongkind; Martijn A. Van Koten; Alain Seive; Willem H. J. Stork, all of Amsterdam, Netherlands

[73] Assignee: Shell Oil Company, Houston, Tex.

[21] Appl. No.: 437,727

[22] Filed: May 9, 1995

[30] Foreign Application Priority Data

May 10, 1994 [EP] European Pat. Off. .............. 94201325

[51] Int. Cl.$^6$ .................................................. C01B 39/00
[52] U.S. Cl. .................... 423/702; 423/703; 423/705; 423/706
[58] Field of Search ................................... 423/701, 702, 423/703, 704, 705, 706

[56] References Cited

U.S. PATENT DOCUMENTS

| | | | |
|---|---|---|---|
| 5,102,643 | 4/1992 | Kresge et al. | 423/702 |
| 5,112,589 | 5/1992 | Johnson et al. | 423/705 |
| 5,143,879 | 9/1992 | Whitehurst | 502/85 |
| 5,191,144 | 3/1993 | Le et al. | 585/643 |
| 5,211,934 | 5/1993 | Kresge et al. | 423/706 |
| 5,300,277 | 4/1994 | Kresge et al. | 423/703 |
| 5,308,602 | 5/1994 | Calabro et al. | |
| 5,320,822 | 6/1994 | Ozin et al. | 423/700 |
| 5,538,711 | 7/1996 | Emerson et al. | 423/701 |

FOREIGN PATENT DOCUMENTS

| | | |
|---|---|---|
| 419334A1 | 3/1991 | European Pat. Off. . |
| 91/11390 | 8/1991 | WIPO . |
| 93/01884 | 2/1993 | WIPO . |

OTHER PUBLICATIONS

Beck et al., J. Am. Chem. Soc., 1992, vol. 114, pp. 10834–10843.
Monnier et al., Science, 1993, vol. 261, pp. 1299–1303.
Lok et al. "The Role of Organic Molecules in Molecular Sieve Synthesis" Zeolites vol. 3 1983 Oct. pp. 282–291.

Primary Examiner—Mark L. Bell
Assistant Examiner—David Sample

[57] ABSTRACT

The present invention relates to a process for the preparation of a large-pore molecular sieve, comprising crystallizing the molecular sieve from a starting mixture at a pH in the range of from 3 to 8, and recovering a large-pore molecular sieve, the said starting mixture having a molar composition satisfying the following molar ratio's:

$$(0.01-2)R_{2/n}O:(0-1.5)M_{2/m}O:(0-0.5)X_2O_3:1YO_2:(5-1000)H_2O:(0.01-3)F^-,$$

wherein n and m are the weighted average valences of R and M respectively, M is an alkali- or alkaline earth metal, X is a trivalent metal and Y is a tetravalent element, wherein R comprises at least one main organic template $R_m$ having the formula $R_1R_2R_3R_4Q^+$ wherein Q is nitrogen or phosphorus and wherein at least one and at most three of $R_1$, $R_2$, $R_3$ and $R_4$ is an aryl or alkyl group having 6 to 36 carbon atoms and each of the remainder of $R_1$, $R_2$, $R_3$ and $R_4$ is selected from hydrogen and an alkyl group having 1 to 5 carbon atoms.

11 Claims, No Drawings

PROCESS FOR PREPARING A LARGE MOLECULAR SIEVE

FIELD OF THE INVENTION

The present invention relates to a process for preparing a large pore molecular sieve. In particular, the present invention relates to a process for preparing a molecular sieve containing pores having diameters of at least 1.3 nm.

BACKGROUND OF THE INVENTION

Such molecular sieves are known in the art. International Application Publication No. WO 93/01884 (WO 93/01884) discloses a hydroprocessing catalyst containing a support material comprising an ultra-large pore crystalline material (molecular sieve) of high surface area and porosity. The crystalline material exhibits after calcination an X-ray diffraction pattern with at least one peak having a relative intensity of 100 at a d-spacing greater than 1.8 nm and having a benzene sorption capacity greater than 15 grams benzene per 100 grams of the material at 6.7 kPa and 25° C.

The crystalline material is typically prepared by crystallization from a starting mixture at strong basic conditions, that is a pH in the range of from 9 to 14. In particular, if the starting mixture does not contain bivalent or pentavalent species it is stated that it is essential to maintain the pH within this range in three out of four synthesis procedures disclosed in WO 93/01884.

The fourth synthesis procedure disclosed in WO 93/01884 should be carried out at a pH of less than 12. In this fourth procedure the same synthesis mixture is to be employed as disclosed with respect to the third synthesis procedure. The lower limit of the pH range which can be used in the fourth procedure is therefore about 9.

Beck et al. (J. Am. Chem Soc. 1992, Vol. 114, pages 10834–10843) discuss the influence of organic templates on the structure and properties of the crystalline material and propose two theoretical models for formation of the crystalline material.

Monnier et al. (Science 1993, Vol. 261, pages 1299–1303) synthesized the crystalline materials at a range of experimental conditions and on the basis of the known experimental results developed a refined model of the formation process which could explain the then known experimental data and which could predict conditions needed for the synthesis of desired structures. According to this publication a pH of at least 9.5 seems essential in order to be able to directly synthesize the crystalline materials. According to Monnier et al. the crystal structure of a monoclinic, layered crystalline material produced in the initial stages of the synthesis process at a pH of at least 9.5 can be altered to a hexagonal crystalline material by a hydrothermal treatment at 373 K at a pH of 7 over 10 days.

It has now been found possible to directly synthesize crystalline material, hereinafter called molecular sieves, as described in WO 93/01884 under acidic, neutral or weak basic conditions, by using starting mixtures containing a fluorine source.

SUMMARY OF THE INVENTION

The present invention therefore relates to a process for the preparation of a large-pore molecular sieve, comprising crystallizing the molecular sieve from a starting mixture at a pH in the range of from 3 to 8, and recovering a large-pore molecular sieve, the said starting mixture having a molar composition satisfying the following molar ratios:

$$(0.01–2)R_{2/n}O:(0–1.5)M_{2/m}O:(0–0.5)X_2O_3:$$
$$1YO_2:(5–1000)H_2O:(0.01–3)F^-,$$

wherein n and m are the weighted average valences of R and M respectively, M is an alkali- or alkaline earth metal, X is a trivalent metal and Y is a tetravalent element, wherein R comprises at least one main organic template $R_m$ having the formula $R_1R_2R_3R_4Q^+$ wherein Q is nitrogen or phosphorus and wherein at least one and at most three of $R_1$, $R_2$, $R_3$ and $R_4$ is an aryl or alkyl group having 6 to 36 carbon atoms and each of the remainder of $R_1$, $R_2$, $R_3$ and $R_4$ is selected from hydrogen and an alkyl group having 1 to 5 carbon atoms. The compound from which the above ammonium or phosphonium ion is derived may be, for example, the hydroxide, halide, silicate or mixtures thereof.

DESCRIPTION OF THE PREFERRED EMBODIMENTS

It will be appreciated that in the starting mixture electroneutrality is preserved. Accordingly, both $R_{2/n}O$ and $M_{2/n}O$ as well as any other ingredient of the starting mixture may be present in the starting mixture in an ionic form.

A disadvantage of the preparation methods under strong basic conditions is that the starting mixture does not contain sufficient $H^+$ to act as counter-ion for $AlO_2^-$ in the molecular sieve crystal lattice. Thus, the starting mixture normally contains alkali- or alkaline earth metal compounds to act as counter-ion.

Alkali- or alkaline earth metal compounds-containing molecular sieves are usually not desired as such molecular sieves are hardly acidic, if at all. Thus, normally the alkali- or alkaline earth metal compounds-containing molecular sieves are first calcined or extracted to remove organic template(s), then ion-exchanged with an aqueous ammonium solution to remove alkali- or alkaline earth metal compounds from ion-exchange sites of the molecular sieve, and finally calcined to convert $NH_4^+$ in ion-exchange sites to H+, while producing $NH_3$ containing gas.

It is known in zeolite synthesis to synthesize zeolitic materials in the presence of $NH_4^+$ rather than alkali- or alkaline earth metals. However, at the high pH employed in the experiments described in WO 93/01884, NH4+ is unstable and converts to NH3. Accordingly, at such high pH $NH_4^+$ cannot normally be used instead of alkali- and/or alkaline earth metal compounds.

In theory it is feasible to synthesize crystalline materials at high pH in the absence of any added counter-ion apart from ionic forms of the organic template(s). However, at strong basic conditions this requires excessive amounts of expensive organic template(s).

It would be particularly desirable if large-pore molecular sieves could be produced from a starting mixture containing substantially no, preferably no, alkali- or alkaline earth metal compound(s).

It has now been found possible to synthesize the crystalline material of the present invention in the absence of alkali- or alkaline-earth metal compounds, and in the presence of fluorine, in accordance with the process of the present invention.

Accordingly, in a preferred embodiment the present invention relates to a process for preparing a large-pore molecular sieve comprising crystallizing the molecular sieve from a starting mixture having a molar composition satisfying the following molar ratio's:

$$(0.01-2)R_{2/n}O:(0-0.5)X_2O_3:1YO_2:(5-1000)\ H_2O:(0.01-3)F^-.$$

More preferably the starting mixture has a molar composition satisfying the following molar ratio's:

$$(0.02-1)R_{2/n}O:(0.0001-0.5)\ X_2O_3:1YO_2:(10-900)\ H_2O:(0.05-2.5)F^-.$$

Preferably, R comprises an additional organic template $R_a$ in the form of an ammonium or phosphonium ion of the above formula $(R_1R_2R_3R_4Q^+)$ but wherein each $R_1$, $R_2$, $R_3$ and $R_4$ is selected from hydrogen and an alkyl group having 1 to 5 carbon atoms, and wherein 2 alkyl groups can be interconnected to form a cyclic compound. The compound from which the additional organic template ion is derived may be, for example, the hydroxide, halide, silicate or mixtures thereof.

The molar ratio additional organic template $R_a$/main organic template $R_m$ may typically range from 0.01 to 100. The total of organic template R being used in the starting mixture should however remain within the ranges described herein. Preferably, the $R_{2/n}O/(YO_2+X_2O_3)$ molar ratio in the starting mixture is at least 0.1 if R comprises both $R_m$ and $R_a$.

In order to vary the pore size of the molecular sieve, the starting mixture may comprise an auxiliary organic compound $R_c$ in addition to the organic templates R, that is $R_m+R_a$, described hereinabove. Typically, this organic compound is selected from the group of aromatic hydrocarbons and amines having 5 to 20 carbon atoms and halogen- and $C_1-C_{14}$ alkyl-substituted derivatives thereof; or cyclic and polycyclic aliphatic hydrocarbons and amines of 5 to 20 carbon atoms and halogen- and $C_1-C_{14}$ alkyl-substituted derivatives thereof; or straight and branched chain aliphatic hydrocarbons and amines having 3 to 16 carbon atoms and hydroxyl or halogen-substituted derivatives thereof.

In the auxiliary organic compounds the halogen derivative is preferably a bromine, fluorine or chlorine derivative.

The molar ratio auxiliary organic compound $R_c/(R_m+R_a)$ may range from 0.02 to 100, preferably from 0.05 to 35. It is to be understood that for the purposes of this specification the auxiliary organic compound $R_c$ is not comprised within the term "organic template(s)", "R" or "$R_{2/n}O$" as used herein. If present in a starting mixture, the molar ratio $R_c/YO_2$ typically ranges from 0.05 to 20, preferably from 0.1 to 10.

Typically, the synthesis is carried out at a crystallization time in the range of from 2 to 336 hours, preferably at a crystallization time in the range of from 12 to 240 hours, more preferably in the range of from 24 to 120 hours.

Typically a reaction temperature is employed in the range of from 60° to 250° C., preferably in the range of from 90° to 200° C.

Preferably, the synthesis is carried out at a pH in the range of from 3 to 7.5, more preferably in the range of from 4 to 7.

X is preferably chosen from Ga, Fe, B and/or Al, more preferably Al. Examples of suitable sources of X include any oxides, hydroxides, sulfates, alkoxides and/or halides of X. Y is preferably chosen from Ti, Zr and/or Si, more preferably Si. Examples of suitable sources of Y include any oxides, alkoxides and/or halides of Y as well as quaternary ammonium compounds such as tetramethylammonium silicate, and tetraethylorthosilicate.

Typically, any source of fluorine ions in the starting mixture can be used in the process of the present invention. Particularly suitable sources include HF and $NH_4F$. For reasons of safety $NH_4F$ is preferably used.

It is to be understood that the amount of $NH_4^+$ in the starting mixture is not critical and is in fact determined by the amount of ammonium salts used in preparation of the starting mixture. NH4+ may even be absent from the starting mixture as in the synthesis according to the present invention ionic forms of the organic template(s) used and any auxiliary organic compound may act as counter-ion in the crystal lattice of the crystalline molecular sieve.

The organic template(s) and any auxiliary organic compound(s) may be removed from the large-pore crystalline molecular sieve according to the present invention by calcining the molecular sieve at a temperature in the range of from 350° to 600° C. for 1 to 24 hours.

Alternatively, R, that is the organic template(s) Rm and optionally $R_a$, and any $R_c$, that is the auxiliary organic compound(s), may be removed from the large-pore crystalline molecular sieve according to the present invention by contacting the molecular sieve with a polar solvent capable of extracting R and any $R_c$ from the molecular sieve. A suitable method has been disclosed in U.S. Pat. No. 5,143,879.

In yet another aspect the present invention relates to a large-pore crystalline molecular sieve having in its calcined state an X-ray diffraction pattern with at least one peak at a d-spacing of at least 1.8 nm, a benzene sorption capacity of more than 15 grams benzene per 100 grams of the crystalline molecular sieve at 6.7 kPa and 25° C., and a chemical composition which can be expressed as follows:

$$0-0.5M_{2/n}O:0-0.5X_2O_3:1YO_2:0-6H_2O:0.001-2F.$$

Ways to determine the benzene sorption capacity are known to those skilled in the art. Suitable techniques have been described in WO 93/01884.

Preferably, the crystalline molecular sieve has the following chemical composition:

$$0.001-0.5X_2O_3:1YO_2:0-6H_2O:0.001-2F.$$

In a most preferred embodiment X is Al and Y is Si.

Typically, in the X-ray diffraction pattern of the crystalline molecular sieve, the relative intensity of the strongest peak at a d-spacing of at least 1.8 nm is 100. Preferably, the X-ray diffraction pattern exhibits no peaks at d-spacings less than 1.0 nm having a relative intensity of more than 20%, more preferably more than 10%, of the strongest peak.

Preferably, the calcined crystalline molecular sieve has an X-ray diffraction pattern in which a d-spacing of at least 1.8 nm can be indexed as $d_{100}$. Ways to index d-spacings in X-ray diffraction patterns are known to those skilled in the art. A suitable method is described in WO 93/01884.

Preferably, the crystalline molecular sieve has a hexagonal arrangement of uniformly-sized pores having diameters of at least 1.3 nm, as defined in WO 93/01884 and WO 91/11390.

In another aspect, the present invention relates to the use of a crystalline molecular sieve according to the present invention as described hereinbefore, as a catalyst, catalyst carrier, adsorbent or as component in a washing composition. Preferably the crystalline molecular sieve is used in its R-free form. It is to be understood that the crystalline molecular sieve may be composited with a matrix material for example when used as catalyst or catalyst carrier for certain applications. Examples of suitable matrix materials have been described in WO 93/01884. Further, it will be appreciated that when the crystalline molecular sieve is used as catalyst or catalyst carrier, the finished catalyst may comprise (catalytically active) metals, such as those from Group VIII or VIB from the Periodic Table of the Elements. In a preferred embodiment, the crystalline molecular sieve in combination with a metal having hydrogenation/- dehydrogenation activity, is used as a hydroprocessing catalyst for hydroprocessing of mineral or synthetic oil feedstocks.

The term hydroprocessing as used herein includes hydrocracking, hydrotreating, hydrofinishing, hydroisomerization, hydrodesulfurization, and hydrodenitrogenation.

In a particular preferred embodiment, the crystalline molecular sieve is used in a hydrocracking and/or hydroisomerization process to produce lubricating base oils from flashed distillates and/or waxy feedstocks, such as slack wax.

The invention will now be illustrated further with reference to the following Examples. The Examples are given for illustrative purposes only and should not be construed as in any way limiting the invention to a scope which is narrower than the present claims.

EXAMPLES

Example I

A synthesis mixture was prepared by admixing colloidal acid-stabilized silica commercially available from Nalco, water, aqueous $NH_4F$ solution, and as organic templates cetyltrimethylammoniumchloride (CTMACl) and trimethylammoniumchloride (TMACl). The synthesis mixture had the following molar composition:

15 $SiO_2$/3.0 TMACl/5.0 CTMACl/500 $H_2O$/6.0 $NH_4F$

The synthesis mixture had a pH of 7. The mixture was heated for 24 hours to 107° C. in a teflon-lined autoclave under autogenous pressure. After washing and filtering a crystalline material was obtained having a X-ray diffraction pattern in which the largest d-spacing amounted to 5.4 nm.

Example II

The as-synthesized crystalline molecular sieve obtained in the experiment described in Example I was subjected to a calcination treatment in air at 540° C. for 10 hours The calcined crystalline material had an X-ray diffraction pattern in which the largest d-spacing amounted to 4.9 nm.

Example III

The experiment described in Example I was repeated, but dodecyltrimethylammoniumbromide (DTMABr) was used instead of cetyltrimethylammoniumchloride, in the same molar amount. After washing and filtering a crystalline material was obtained having a X-ray diffraction pattern in which the largest d-spacing amounted to 4.3 nm.

Example IV

A synthesis mixture was prepared by admixing colloidal acid-stabilized silica commercially available from Nalco, water, aqueous $NH_4F$ solution, and as organic templates cetyltrimethylammoniumbromide (CTMABr) and trimethylammoniumchloride (TMACl). The synthesis mixture had the following molar composition:

8.1 $SiO_2$/1.5 TMACl/4.0 CTMABr/500 $H_2O$/1.1 $NH_4F$

The mixture was heated for 100 hours at 108° C. in a teflon-lined autoclave under autogenous pressure. After washing and filtering a crystalline material was obtained having a X-ray diffraction pattern in which the largest d-spacing amounted to 5.7 nm.

Example V

A synthesis mixture was prepared by admixing colloidal acid-stabilized silica commercially available from Nalco, water, aqueous $NH_4F$ solution, cetyltrimethylammoniumbromide (CTMABr), trimethylammoniumchloride (TMACl) and aluminumchloride ($AlCl_3.6H_2O$). The synthesis mixture had the following molar composition:

15.0 $SiO_2$/0.75 $AlO_2$—/3.0 TMACl/5.0 CTMABr/500 $H_2O$/6.0 $NH_4F$

The mixture was heated for 24 hours at 106° C. in a teflon-lined autoclave under autogenous pressure. After washing and filtering a crystalline material was obtained having a X-ray diffraction pattern in which the largest d-spacing amounted to 6.5 nm.

Example VI

A synthesis mixture was prepared by admixing colloidal acid-stabilized silica commercially available from Nalco, water, aqueous $NH_4F$ solution, dodecyltrimethylammoniumbromide (DTMABr), triethylammoniumchloride (TEACl) and aluminumchloride ($AlCl_3.6H_2O$). The synthesis mixture had the following molar composition:

15.3 $SiO_2$/1.0 $AlO_2$—/3.0 TEACl/3.25 DTMABr/300 $H_2O$/1.0 $NH_4F$

The mixture was heated for 75 hours at 108° C. in a teflon-lined autoclave under autogenous pressure. After washing and filtering a crystalline material was obtained having a X-ray diffraction pattern in which the largest d-spacing amounted to 5.1 nm.

What is claimed is:

1. A process for the preparation of a large-pore molecular sieve having in its calcined state an X-ray diffraction pattern with at least one peak at a d-spacing of at least 1.8 nanometers, comprising crystallizing the molecular sieve from a starting mixture at a pH in the range of from 3 to 8, and recovering a large-pore molecular sieve, the said starting mixture having a molar composition satisfying the following molar ratios:

$(0.01–2)R_{2/n}O:(0–1.5)M_{2/m}O$
$:(0–0.5)X_2O_3:1YO_2:(5–1000)H_2O:(0.01–3)F^-$, wherein n and m are the weighted average valences of R and M respectively, M is an alkali- or alkaline earth metal, X is a trivalent metal and Y is a tetravalent element, wherein R comprises at least one main organic template $R_m$ having the formula $R_1R_2R_3R_4Q^+$ wherein Q is nitrogen or phosphorus, wherein at least one and at most three of $R_1$, $R_2$, $R_3$ and $R_4$ is an aryl or alkyl group having 6 to 36 carbon atoms and each of the remainder of $R_1$, $R_2$, $R_3$ and $R_4$ is selected from hydrogen and an alkyl group having 1 to 5 carbon atoms, and wherein the fluorine source is selected from the group consisting of HF, $NH_4F$ and mixtures thereof.

2. The process as claimed in claim 1, characterized in that the starting mixture has a molar composition satisfying the following molar ratios:

$(0.01–2)R_{2/n}O:(0–0.5)X_2O_3:1YO_2:(5–1000)H_2O: (0.01–3)F^-$.

3. The process as claimed in claim 2, characterized in that the starting mixture has a molar composition satisfying the following molar ratio's:

$(0.02-1)R_{2/n}O:(0.0001-0.5)X_2O_3:1YO_2:(10-900)H_2O:(0.05-2.5)F^-$.

4. The process as claimed in claim 1, wherein R further comprises $R_a$ having the formula $R_5R_6R_7R_8Q^+$ wherein Q is nitrogen or phosphorus and each of $R_5$, $R_6$, $R_7$ and $R_8$ is selected from hydrogen and an alkyl group having 1 to 5 carbon atoms, wherein 2 alkyl groups can be interconnected to form a cyclic compound.

5. The process as claimed in claim 1, wherein the starting mixture further comprises an auxiliary organic compound $R_c$ selected from the group of aromatic hydrocarbons and amines having 5 to 20 carbon atoms and halogen- and $C_1-C_{14}$ alkyl-substituted derivatives thereof, cyclic and polycyclic aliphatic hydrocarbons and amines of 5 to 20 carbon atoms and halogen- and $C_1-C_{14}$ alkyl-substituted derivatives thereof, straight and branched chain aliphatic hydrocarbons and amines having 3 to 16 carbon atoms and hydroxyl- or halogen-substituted derivatives thereof.

6. The process as claimed in claim 5, characterized in that the molar ratio $R_c/YO_2$ ranges from about 0.05 to about 20.

7. The process as claimed in claim 1, characterized in that the reaction temperature is in the range of from about 60° C. to 250° C.

8. The process as claimed in claim 1, characterized in that the crystallization time is in the range of from about 2 to about 336 hours.

9. The process as claimed in claim 1, characterized in that the pH is in the range of from about 3 to about 7.5.

10. The process as claimed in claim 1, characterized in that X is selected from the group consisting of Ga, Fe, B, Al and mixtures thereof.

11. The process as claimed in claim 1, characterized in that Y is selected from the group consisting of Ti, Zr, Si and mixtures thereof.

* * * * *